Feb. 24, 1953 R. A. MILLER 2,629,548
TAXIMETER
Filed April 5, 1949 5 Sheets-Sheet 5
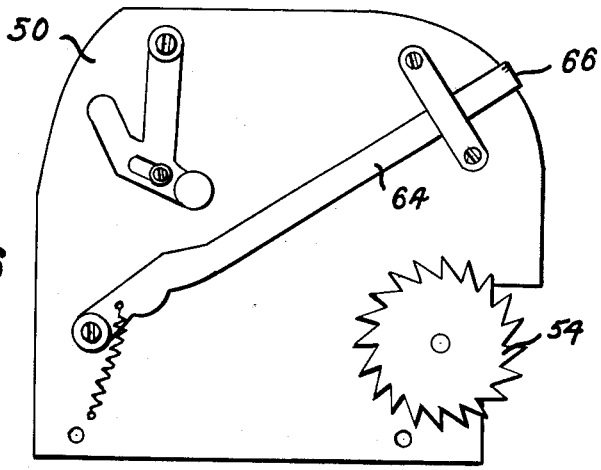
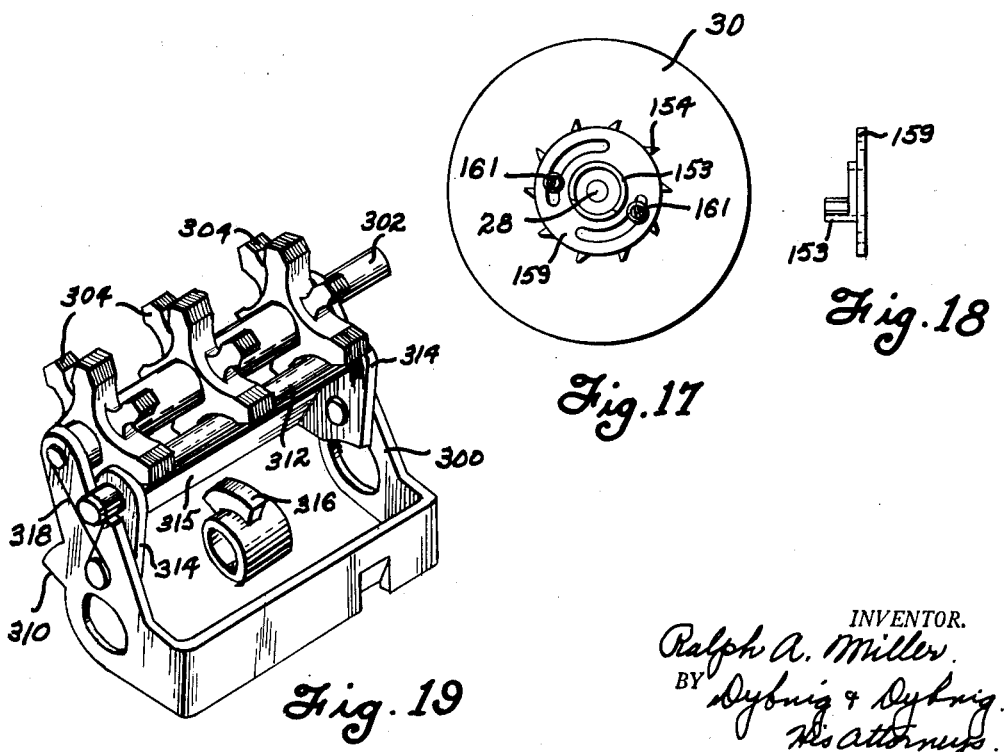
INVENTOR.
Ralph A. Miller.
BY Dybvig & Dybvig.
His attorneys.

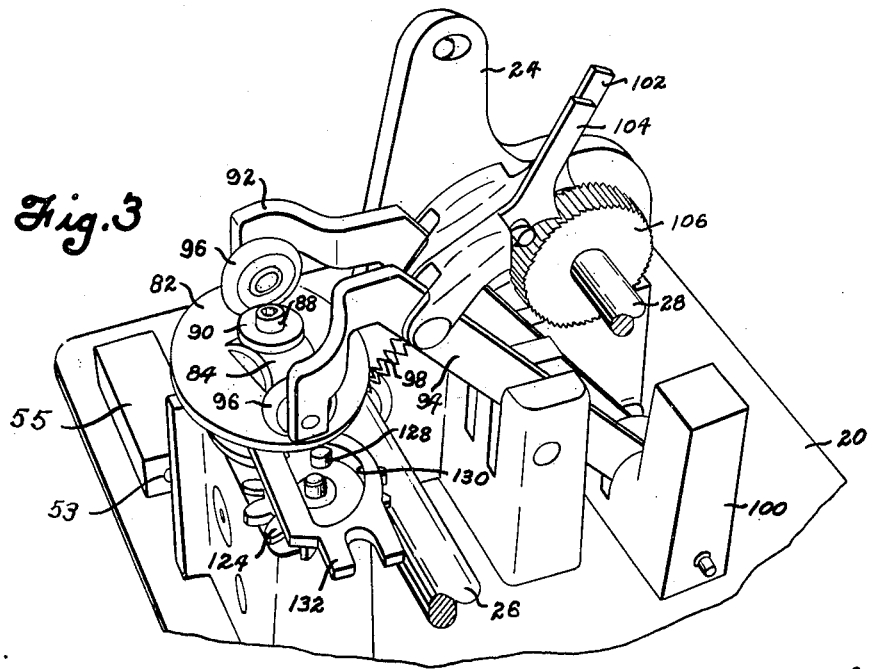

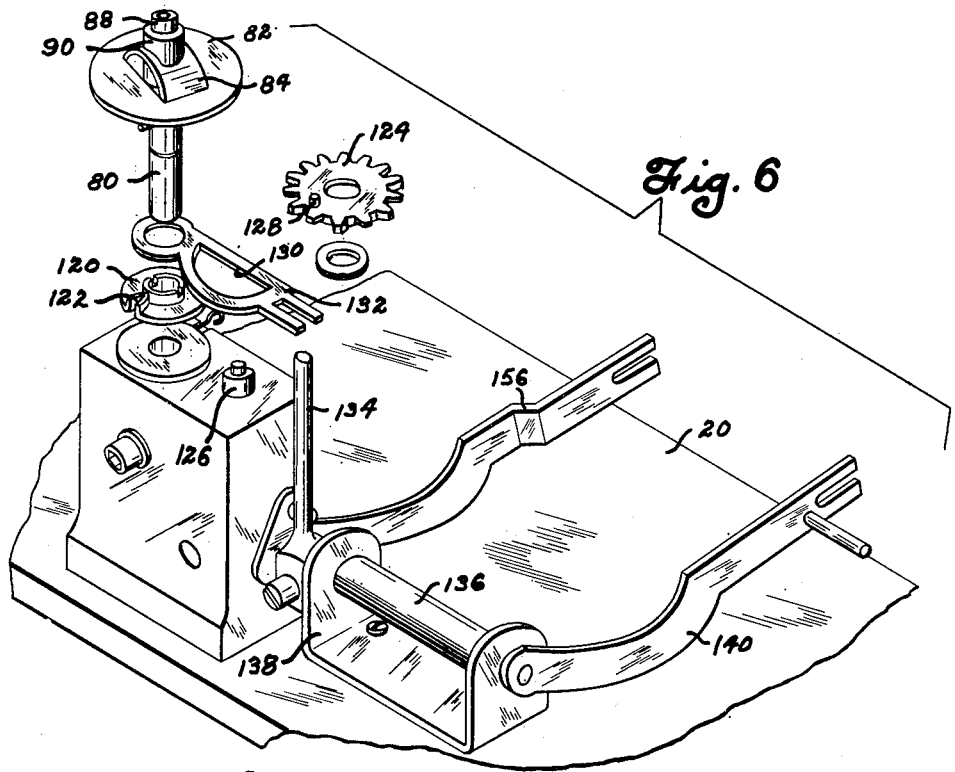

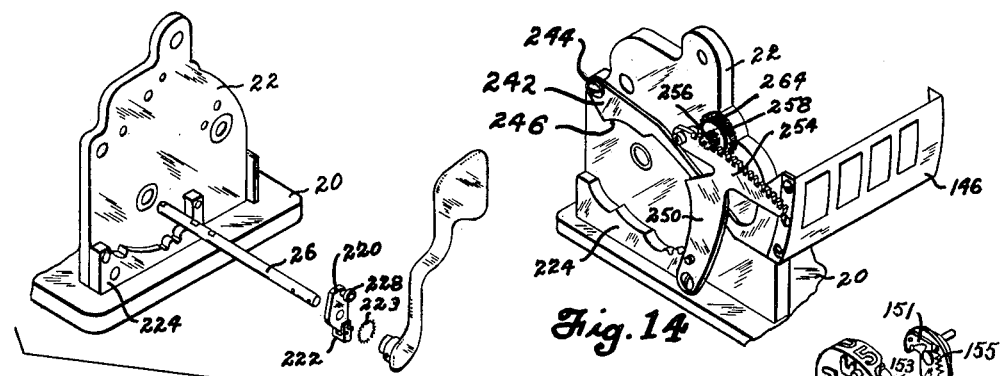
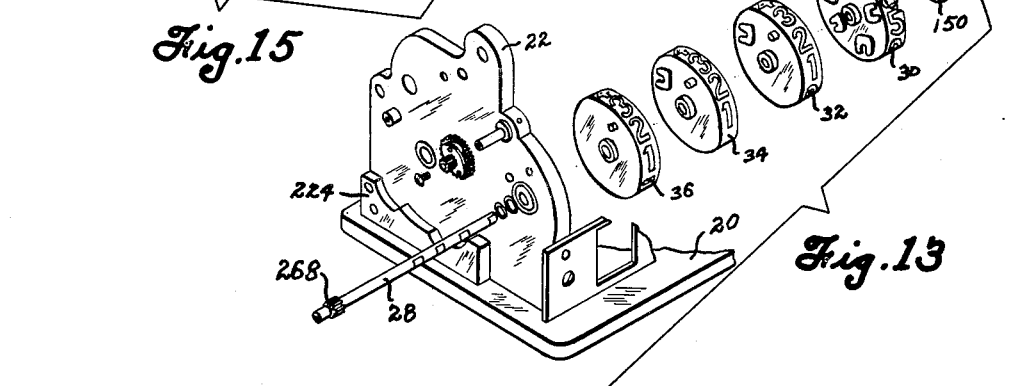
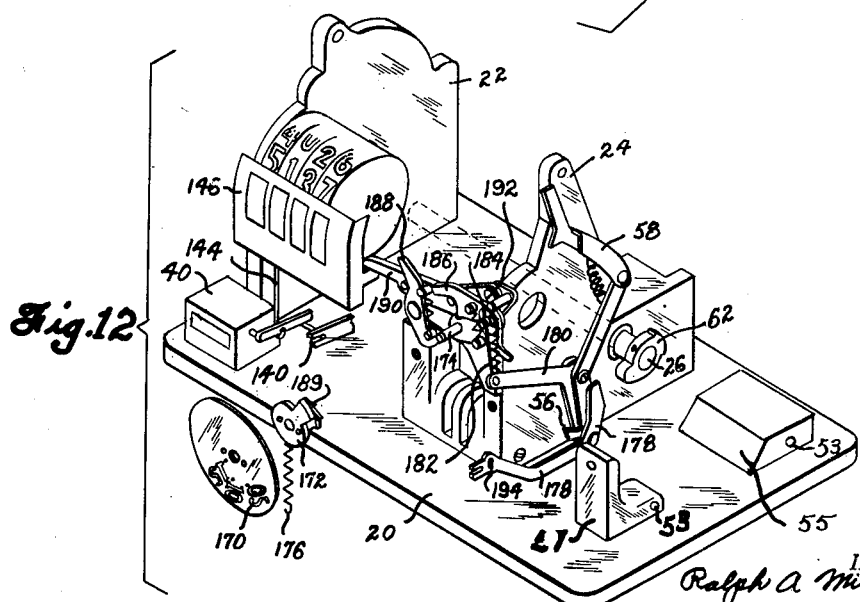

Patented Feb. 24, 1953

2,629,548

UNITED STATES PATENT OFFICE 2,629,548

TAXIMETER

Ralph A. Miller, Dayton, Ohio, assignor, by mesne assignments, to The Dayton Taximeter Co., a corporation of Ohio Application April 5, 1949, Serial No. 85,659

10 Claims. (Cl. 235—30)

This invention relates to a taximeter for use in localities where the taxi rates are based on various factors such as time and mileage traveled.

This application is related to and represents improvements over the Chester A. Rhoads et al. copending application, Serial Number 752,086, filed June 3, 1947.

The legal fare to be charged for a ride in a taxi is usually dependent upon many different factors and these factors vary from city to city, with the result that any practical meter must provide satisfactory arrangements for adjusting the meter so as to take care of these variations in the rates and rate factors. Any arrangement for making these adjustments must be such that the taxi driver cannot make unauthorized adjustments so as to cheat the customers or the taxi owner. Likewise, the adjustments must be simple to make and the meter must be easy to repair. Another important factor is that the meter must be fair to the cab driver so that he receives all the fare to which he is justly entitled. Thus, it is an object of this invention to provide a simplified, yet accurate and foolproof, taximeter.

Another object of this invention is to provide simplified power transmitting mechanisms which permit the use of low cost stampings.

Another object of this invention is to provide a meter in which the parts are compactly and orderly arranged.

Still another object of this invention is to provide a meter in which the clock mechanism is readily removable as a unit for repair and/or replacement.

Other objects and advantages reside in the construction of parts, the combination thereof and the mode of operation, as will become more apparent from the following description.

In the drawings:

Figure 3 is a fragmentary perspective view showing the wabble plate drive mechanism;

Figure 4 is a fragmentary perspective view showing the flag shaft positioning star wheel;

Figure 5 is an elevational view showing the full stroke mechanism for the flag shaft;

Figure 6 is an exploded perspective view showing the construction of the mileage actuated mechanism;

Figure 7 is a fragmentary plan view showing the Geneva drive mechanism;

Figure 8 is a fragmentary sectional view showing the mileage responsive mechanism;

Figure 9 is a side elevational view of a portion of the fare drum return mechanism;

Figure 10 is a front elevational view of the mechanism shown in Figure 9;

Figure 11 is a side elevational view of the gearing which cooperates with the mechanism shown in Figures 9 and 10;

Figure 12 is an exploded perspective view, partly schematic, showing the extra fare mechanism;

Figure 13 is an exploded perspective view showing the fare drums;

Figure 14 is a perspective view of a portion of the fare drum mechanism;

Figure 15 is an exploded perspective view showing the full stroke mechanism;

Figure 16 is an elevational view of the clock mechanism;

Figure 17 is an end elevational view of the one fare drum showing a portion of the drum actuating mechanism;

Figure 18 is an elevational view of one of the ratchet dropping cams; and

Figure 19 is a perspective view of the coordinating gear mechanism.

Figure 1:
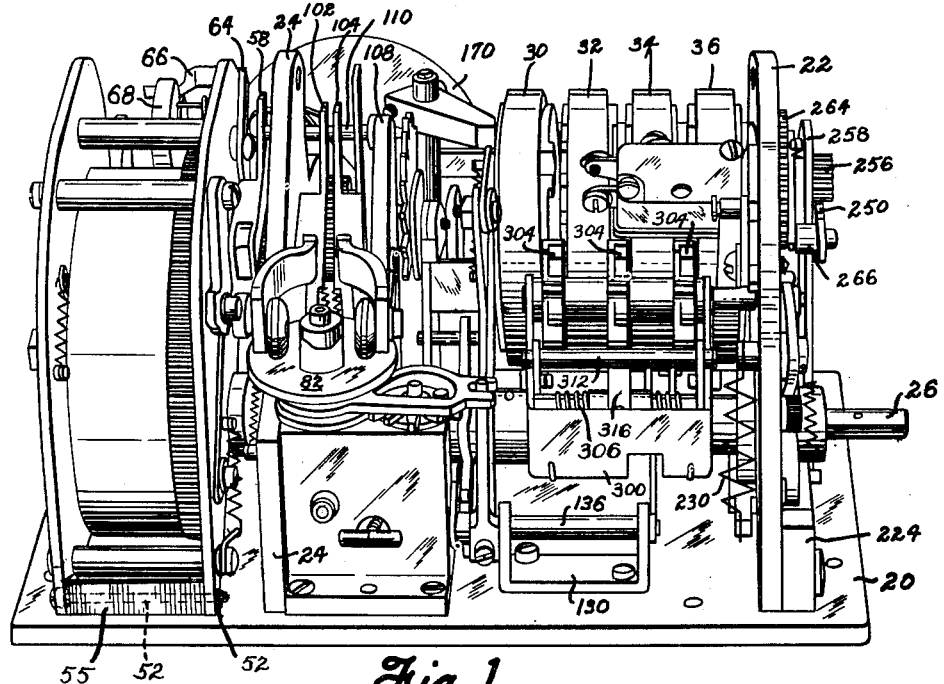
Figure 1 is a perspective view showing the rear side of the meter with the cover removed.
Figure 2:
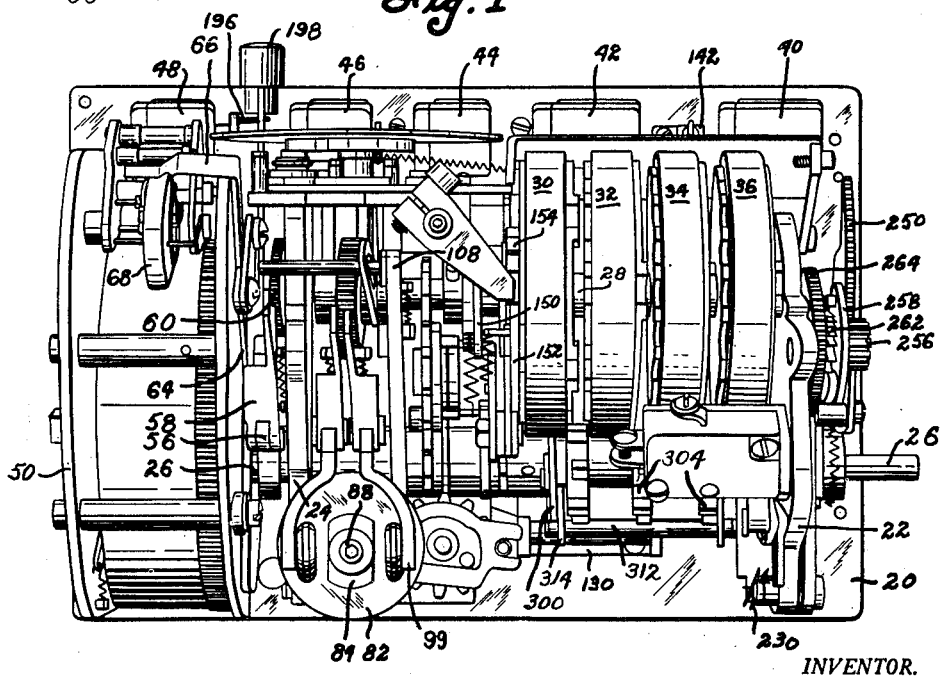
Figure 2 is a perspective view of the meter, looking down, with the cover removed.

Referring now to Figures 1 and 2 of the drawings, reference numeral 20 designates a base plate which is provided with a pair of integrally formed upright bearing plates 22 and 24 which serve to support the flag shaft 26 and the main operating shaft 28 which in turn serves to support the fare drums 30, 32, 34 and 36 as shown. The shafts 26 and 28 constitute the two main shafts on which all of the principal operating parts are supported, as will be explained more fully hereinafter.

Adjacent the front edge of the base 20, there are provided odometers 40, 42, 44, 46 and 48 which are adapted to indicate respectively the paid mileage, total mileage, total number of units (that is, total number of fare units indicated by the fare drums), total number of trips and total number of extra fares. The mechanism for operating these indicators will be described more fully hereinafter.

Since most localities allow for a charge to be made for the use of a taxi based on the time, even though the taxi stands still, each meter is provided with a clock mechanism 50 which is removably supported on the base 20 as a self-contained unit. By making the clock a self-contained unit which is removably mounted on the base, it is possible to quickly replace the entire clock assembly in the event that the clock gives trouble. The clock assembly may be secured to the base in any suitable manner such as by means of removable cap screws 52 (see Figures 1 and 12) which extend through openings 53 formed in upstanding projections 55 and 57 which are formed integrally with the base 20.

The clock mechanism includes a ratchet or cam wheel 54 (see Figure 16) which actuates a drop lever or cam follower 56 (see Figure 12) which is somewhat in the shape of a bell crank and which pivotally supports a pawl 58 (see also Figure 2) which is arranged to drive a ratchet wheel 60 keyed to the main shaft 28 as shown. Rotation of the shaft 28 in response to operation of the clock 50 then serves to actuate the fare recording drums in accordance with standard practice. The clock is adapted to be started and stopped in response to movement of the flag shaft 26 into the "meter on" or its fully lowered position. Thus the flag shaft 26 is provided with a clock controlling cam 62 (see Figures 12 and 16) which actuates the clock starting and stopping lever 64. As best indicated in Figures 1, 2 and 16, the clock control lever 64 is provided with a projection 66 which engages the flywheel 68 of the clock. The arrangement of the clock mechanism is such that the lever 64 prevents operation of the clock when the flag is in its uppermost position or in its intermediate position, but just as soon as the taxi is engaged and the operator lowers the flag to its lowermost position, the clock will begin operating the main drive shaft at a predetermined rate. For a more detailed description of the manner in which the clock mechanism operates the fare drums, reference is hereby made to the above-mentioned copending application Serial Number 752,086.

One of the most difficult problems in any meter is to provide a satisfactory means which properly responds to the mileage traveled. It has been found that a very satisfactory mileage responsive mechanism can be made by suing a wabble plate type of drive. As pointed out in said copending application, a wabble plate type of drive has numerous advantages over most or all other drives in that it operates equally well when the cab goes forward as when the cab goes backward and it begins to operate immediately upon movement of the cab in either direction. The specific wabble plate mechanism disclosed herein represents an improvement over the wabble plate mechanism shown in the aforementioned copending application for the reasons to be now explained.

Referring now to Figures 3, 5, 6 and 7 of the drawings, it will be observed that a first and main drive shaft 80 has been provided which is adapted to be directly connected to the speedometer cable so as to rotate in unison with the speedometer cable. A stamped sheet metal wabble plate 82 is adapted to be supported adjacent the upper end of the shaft 80 so as to rotate therewith. The wabble plate 82 is made from a single stamping and includes a slotted embossed curved portion 84 which cooperates with a curved surface 86 provided on the upper end of the shaft 80 as best shown in Figure 8. The wabble plate is held in place in the desired adjusted position by means of a cap screw 88 and a clamping lug 90 which has a lower curved surface arranged to frictionally engage the embossed portion 84 on the wabble plate 82. The angle of tilt of the wabble plate can thus be very quickly adjusted merely by loosening the one screw 88 and then tilting the wabble plate the desired amount.

As best shown in Figure 3, the wabble plate 82 cooperates with a pair of pivoted levers 92 and 94 through rollers 96 journalled in the free ends of the levers 92 and 94 as shown. The levers 92 and 94 are biased into engagement with the wabble plate by means of a pair of springs 98. The levers 92 and 94 are pivotally supported adjacent the lower ends on the bearing block 100 which is preferably formed as an integral part of the base 20. The levers 92 and 94 are provided with pawls 102 and 104 respectively which cooperate with a ratchet wheel 106 fixed to the main drive shaft 28 so that as the speedometer shaft rotates, the main meter operating shaft 28 is rotated thereby at a predetermined rate which depends upon the angle of tilt of the wabble plate 82.

It will be observed that by providing two levers for engagement with opposite sides of the wabble plate, one or the other of the levers is at all times effective to actuate the main shaft. Thus, when lever 92 rides up the inclined surface of the wabble plate 82, the pawl 102 will step the ratchet wheel 106 around as the pawl 104 rides over the teeth of the ratchet wheel 106 in a reverse direction. Whenever the cab stops, it is immaterial which direction the cab starts up in, as one or the other of the levers 92 or 94 is always ready to actuate the ratchet wheel 106 in the correct direction.

In order to render the pawls 102 and 104, ineffective, as when no paying passenger is occupying the cab, the flag shaft 26 is provided with a lever 108 (see Figures 1 and 2) which has its lower end keyed to the flag shaft 26 and which supports a pawl engaging crossbar 110 at its upper end. The crossbar 110 is long enough so that it not only engages the pawls 102 and 104 but also engages the clock operated pawl 58. Thus, when the flag shaft is moved into its upper position, the crossbar 110 lifts the pawls 58, 102 and 104 out of driving engagement with the ratchets carried by the shaft 28.

It has been found desirable to provide means for indicating the total number of miles traveled by the cab. As best shown in Figures 3 and 6, the mechanism for indicating the total mileage driven by the cab driver comprises a Geneva gear drive mechanism including a drive gear 120 which is keyed to the shaft 80 as best shown in Figures 5 and 7. The drive gear 120 is provided with one or more notches 122 for engaging the gear teeth on the driven gear wheel 124. For purposes of illustration, I have shown the driven gear wheel 124 provided with 14 teeth, whereas this may be varied without departing from the spirit of my invention. The arrangement is such that when using a drive gear 120 having one notch, the shaft 80 will be required to make 14 revolutions in order to drive the driven gear 124 one revolution. The gear 124 is rotatably supported on a stationary bearing 126 and is provided with a pin 128 which operates within the slot 130 provided in the lever 132 which is pivotally supported directly on the shaft 80. The free end of the lever 132 is provided with a slotted projection which straddles the arm 134, with the result that for every one revolution of the driven gear 124, the lever 132 and the arm 134 will oscillate back and forth once in their respective planes. The arm 134 is secured to a shaft 136 journalled on a frame 138 suitably secured to the base 20 as shown. The shaft 136 has a first odometer engaging lever 140 which extends from the rear edge of the meter toward the front edge of the meter so as to operate the paid mileage odometer and the total mileage odometer 42. The construction of the Geneva mechanism is preferably such that the odometer operating lever 140 will be actuated once for every tenth mile traversed by the cab.

In addition to keeping a record of the total mileage covered by the cab, it is also desirable to provide means for indicating the total paid mileage which, of course, would be less than the total mileage. The lever 140, which actuates the total mileage odometer 42, also serves to actuate the paid mileage odometer 40, but in order to prevent operation of the paid mileage odometer when the meter is off, I have provided means for holding the paid mileage odometer actuating arm 142 in the raised position at all times when the flag is in the raised position. This means is best shown in Figure 12 and constitutes a hook 144 attached to the movable shield 146 which is moved into the raised position whenever the meter is turned off, in a manner which will be explained more fully hereinafter. By virtue of the above described arrangement, an accurate record is kept of the total mileage covered by the cab as well as the total paid mileage.

The mechanism for transmitting power from the shaft 28 to the fare drums in the forward direction or in response to operation of the shaft 28 by either the clock 50 or the mileage actuated wabble plate drive is essentially the same as that shown and claimed in said copending application and therefore will not be described in great detail herein. Essentially it comprises a cam disc or wheel 150 provided on the shaft 28 and rotatable with the shaft 28 at all times. A drop lever or pawl arrangement 152 (see Figure 2) rides over the periphery of the cam 150 and this in turn drivingly cooperates with the teeth on a ratchet wheel 154 secured to rotate in unison with the first fare drum 30 (see Figure 17). By virtue of this arrangement, it requires one revolution of the drive shaft 28 and the cam 150 to step the fare drum 30 around the distance of one tooth of the ratchet wheel 154. Each tooth on the ratchet wheel 154 represents one fare unit. Oscillation of the lever arrangement 152 also causes oscillation of the fare unit's odometer operating arm 156 (see Figure 6), whereby the unit odometer will be operated once for each time the fare drum 30 moves around one unit. In the preferred arrangement, the ratch wheel 154 is provided with 10 teeth so that ten oscillations of the lever arrangement 152 rotates the unit fare drum 30 through one complete revolution.

The above-mentioned pawl and ratchet drive is ineffective in returning the fare drums to their zero setting at the end of each trip. Reset mechanism, which will be described hereinafter, serves to rotate the shaft 28 in reverse when it is desired to return the fare drums to their zero setting. The mechanism for transmitting power from the shaft 28 to the fare drums during the resetting operation will now be described.

The cam disc or wheel 150 carried by the shaft 28, as described hereinabove, is provided with a one-way clutch element or pawl 151 (see Figures 13, 17 and 18) which is biased by the spring 155 into engagement with a ratchet or projection 153 secured to the one face of the ratchet wheel 154 as best shown in Figures 13, 17 and 18. The ratchet 153 extends only part way around the shaft and is adapted to be picked up by the pawl 151 only during the fare drum resetting operation. In other words, the pawl 151 is ineffective for driving the fare drums in the forward direction but is effective to drive the fare drums back to their zero setting in response to operation of the fare drum return mechanism to be described hereinafter. The ratchet 153 is provided with a slotted flange 159 which cooperates with screws 161 carried by the ratchet wheel 154 so as to allow for relative adjustment between the ratchet 153 and the wheel 154. This adjustment is used for establishing or correcting the zero setting of the meter.

It is customary practice in most cities to allow an extra charge to be made for extra passengers. The meter disclosed herein provides means for giving a visual indication as to the extra charge made for the extra passengers (or extra fares as they are generally called) and it also includes means for keeping a record of the total number of extra charges or fares. The extra fare mechanism is best shown in Figure 12 of the drawings wherein reference numeral 170 designates a rotatable dial having suitable indicia thereon for indicating the charge to be made for the extra passengers or fares carried. This dial 170 is attached to a ratchet assembly 172 which is rotatably supported on a stationary pin 174. A spring 176, which has its one end attached to the ratchet assembly 172 and has its other end attached to the main frame, biases the dial 170 and the ratchet assembly 172 to the zero position. The extra fare mechanism is operated by pushing in on the lever 178 which extends out to the front wall of the meter housing so as to be accessible to the operator from the outside. The operating lever 178 is pivotally connected to the bell crank 180 which connects to a wire-like link 182 which has its upper end attached to a pin 184 carried by the ratchet operating member 186. The member 186 is arranged to engage the teeth 189 on the ratchet assembly 172 so that for each time the lever 178 is pushed by the taxi driver, the extra fare indicating dial 170 is stepped around one step. For purposes of illustrating my invention, I have shown a dial in which the charge for each extra fare is 5 cents and consequently pushing of the lever 178 once would cause the number .05 to show through the usual window (not shown) provided in the front wall of the main taximeter casing. A spring biased stop pawl 188 is provided as shown for normally preventing reverse rotation of the ratchet assembly.

In order to reset the extra fare dial at the end of each trip, a reset lever 190 has been provided. This lever is pivotally supported at its one end on a fixed pin 192 and has its other end arranged to engage a projection on the movable shield 146. Since this movable shield 146 is lifted in response to movement of the flag into its raised position, it is obvious that raising of the flag serves to release both of the ratchet engaging levers or pawls 186 and 188 whereby the extra fare indicator is allowed to be returned to its zero position by the spring 176.

In order to keep a record of the total extra fares, the lever 178 is provided with a slot 194 which is adapted to engage the operator 196 (see Figure 2) of the odometer 48. The free end of the lever 178 has attached thereto an operating button 198 which is adapted to extend through the front wall of the meter housing.

As best shown in Figures 4, 5, 13, 14 and 15, the flag shaft 26 is provided with a full stroke mechanism which comprises a lever 220 fixed to the shaft and which carries a pivoted locking member 222 which rides over a fixed cam 224 designed as shown. A spring 223, which has its ends suitably secured to the free end of the lever 222, serves to urge the lever into the position in which it is shown in Figure 5 but allows the lever to ride over the cam 224 in either direction of travel. The shape of the cam 224 is such that when the flag shaft 26 is rotated from the flag down position in which the shaft is shown in Figure 5, it is necessary to move the flag all the way up through its full stroke before it is possible to again return the flag to its down position. Likewise, it is necessary to move the flag all the way down once one starts moving the flag down before it is possible to reraise the flag.

As shown in Figure 4, a star cam 226 is fixed to the shaft 26 and cooperates with a spring pressed detent lever 228. The lever 228 is adapted to engage within any one of the three notches provided around the periphery of the cam 226. The heavy spring 230, which has its one end fixed to the end plate 22 and has its other end attached to the lever 228, serves to hold the flag shaft in any one of the three possible positions of the flag shaft.

When the flag is in the fully raised position, the meter is in the off position and neither the clock nor the speedometer cable actuates the shaft 23 and the associated fare indicating drums. In raising the flag, the meter is reset to its initial or zero setting as will be more fully explained hereinafter. If the flag is lowered only half way, the speedometer cable only is effective in operating the fare drums. When the flag is in the fully lowered position, the meter operates in response to both time and mileage.

Operation of the flag into its raised position or "meter off" position serves to lift the shield 146 which is arranged in front of the fare drums. In this connection, it will be noted that the lever 220 (see Figure 5) includes a projecting portion 240 which in cooperation with the cam surface 246 serves to lift the shield elevating lever 242. This latter lever has its one end pivotally secured to the end frame 22 at 244 and serves to support the shield 146 at its free end as best shown in Figure 14.

At the completion of each trip it is necessary to reset the fare drums to their initial setting. In order to do this, there is also provided a roller 248 on the projection 240 which is adapted to engage the fare drum resetting rack or lever element 250. The element 250 is pivoted at its bottom end on a fixed pivot 252 carried by the end frame 22. The upper end of the element 250 is provided with teeth 254 which are adapted to engage the pinion 256 which is secured to rotate in unison with the pawl supporting disc 258 (see Figures 9, 10 and 11). The disc 258 has pivotally carried thereby a pawl 260 which is adapted to engage the ratchet teeth 262 provided on the gear element 264. The pawl 260 normally remains in engagement with the ratchet teeth 262 so as to cause the pinion gear 256 and the gear 264 to rotate in unison in response to actuation of the rack 250. The rack 250 is provided with a pawl release pin 266 which is adapted to engage the pawl 260 only when the rack 250 moves to its one extreme position as shown in Figure 14. By virtue of the above described arrangement, movement of the flag shaft and the projecting arm portion 240 carried thereby serves to actuate the rack member 250, and this in turn serves to operate the gears 256 and 264. The gear 264 is at all times in driving engagement with the pinion gear 268 (see Figure 13) fixed to the main fare drum operating shaft 28. The shaft 28 serves to support the various fare drums as explained hereinabove and consequently rotation of the shaft 28 by the above described gearing arrangement in response to raising the flag serves to return the fare drums to their initial position through the medium of the pawl 151 and ratchet 153 described hereinabove. The rack 250 is at all times biased counterclockwise, as viewed in Figure 5, by means of a strong spring 270 carried by the end plate 22 as shown in Figure 5.

In Figure 19 of the drawings there is shown the construction of the coordinating gears used in transferring movement from one fare drum to the other and for use in coordinating the fare drums. As indicated therein, a main frame 300 which is adapted to be loosely supported on the flag shaft 26 supports a gear shaft 302 on which the coordinating gears 304 are supported. The gears 304 are normally free to rotate relative to the shaft 302 during operation of the meter. Suitable spring means 306 (see Figure 1) serves to urge the frame 300 and the gears 304 carried thereby toward the fare drums. When the flag shaft is raised, the frame 300 and the gears 304 are moved away from the fare drums by means of the crossbar 308 (see Figure 4) which moves into engagement with the projection 310 provided on the main frame 300.

A gear aligning bar 312 carried by a pivoted support 314 serves to move into engagement with the transfer gears 304 so as to properly line up these gears when the flag shaft is in its raised position and the gears 304 are moved away from the fare drums. However, as the flag shaft is lowered and the transfer gears move into engagement with the fare drums, the cam 316 secured to the flag shaft 26 engages the crossbar 315 of the support 314 and cams the support 314 and the bar 312 carried thereby away from the transfer gears so as to allow the transfer gears to freely rotate independently of one another and to perform their intended function. The bar 312 is biased into engagement with the teeth of the transfer gears 304 by means of a spring 318 which is arranged as shown in Figure 19. Upon the completion of a strip and upon raising the flag, the cam 316 moves out of engagement with the crossbar 315 so as to allow the bar 312 to move into engagement with the teeth of the coordinating gears. The position of the cam 316 on the flag shaft is such that the bar 312 moves in between the teeth of the gears before the gears are lifted away from the fare drums. Furthermore, the arrangement is such that the transfer gears move out of engagement with the fare drums before the fare drum return mechanism returns the fare drums to their zero setting.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a taximeter, a drive shaft which is adapted to be connected to the speedometer cable, a driven shaft, a wabble plate carried by said drive shaft, a ratchet wheel carried by said driven shaft, pawl means having a first portion riding on said wabble plate and a second portion arranged to drive said ratchet wheel in response to rotation of said wabble plate, means for adjusting the angle of the wabble plate whereby the speed ratio between said driven shaft and said drive shaft may be varied, fare indicating means operated in response to rotation of said driven shaft, mileage indicating mechanism, and power transmitting means between said drive shaft and said indicating mechanism, said power transmitting means comprising a Geneva drive having a fixed drive ratio.

2. In a taximeter, a drive shaft which is adapted to be connected to the speedometer cable, a first driven shaft, a wabble plate carried by said drive shaft, a ratchet wheel carried by said first driven shaft, pawl means having a first portion riding on said wabble plate and a second portion arranged to drive said ratchet wheel in response to rotation of said wabble plate, means for adjusting the angle of the wabble plate whereby the speed ratio between said first driven shaft and said drive shaft may be varied, fare indicating means operated by said first driven shaft, mileage indicating means, power transmitting means between said drive shaft and said mileage indicating means, said power transmitting means comprising a Geneva gear mounted on said drive shaft, and means driven by said Geneva gear at a fixed reduced speed ratio relative to said drive shaft, said mileage indicating means comprising a counter calibrated for indicating the total miles driven.

3. In a taximeter, a frame, a flag shaft rotatably supported on said frame, a drive shaft which is adapted to be connected to the speedometer cable, a first driven shaft, a wabble plate carried by said drive shaft, a ratchet wheel carried by said first driven shaft, pawl means having a first portion riding on said wabble plate and a second portion arranged to drive said ratchet wheel in response to rotation of said wabble plate, means for adjusting the angle of the wabble plate whereby the speed ratio between said first driven shaft and said drive shaft may be varied, fare indicating means operated by said first driven shaft, a second driven shaft, power transmitting means between said drive shaft and said second driven shaft, said power transmitting means comprising a Geneva drive having a fixed drive ratio, total mileage indicating means operated by said second driven shaft, a paid mileage indicator, power transmitting means connecting said paid mileage indicator in driving engagement with said second driven shaft, and means operable in response to a predetermined movement of said flag shaft for rendering said last named power transmitting means ineffective during unpaid mileage operation.

4. In a taximeter, a speed responsive drive shaft adapted to be connected to a speedometer cable, a first driven shaft, fare indicating means operated by said first driven shaft, a wabble plate carried by said drive shaft, a ratchet wheel carried by said driven shaft, power transmitting means having a cam portion riding on said wabble plate and a pawl portion arranged to drive said ratchet wheel in response to rotation of said wabble plate, means for adjusting the angle of the wabble plate whereby the speed ratio between said drive shaft and said first driven shaft may be varied, a second driven shaft, power transmitting means between said drive shaft and said second driven shaft, said power transmitting means comprising a Geneva drive mechanism having a fixed drive ratio, mileage indicating means operated by said second driven shaft, said Geneva drive mechanism including a first gear arranged to drive a second gear, a projecting pin carried on said second gear, and an oscillating lever rotatably supported on said speed responsive drive shaft, said lever having a slotted portion arranged to engage said pin whereby rotation of said second gear oscillates said lever, said lever being arranged in driving engagement with said second driven shaft.

5. In a taximeter or the like, a base, a vertically arranged drive shaft supported to project through said base, a horizontally arranged driven shaft supported above said base, means operated in response to rotation of said driven shaft including fare indicating drums supported on said driven shaft, a wabble plate supported on the upper end of said vertical shaft, power transmitting means between said wabble plate and said driven shaft, a Geneva gear affixed to said vertical shaft so as to rotate therewith, a gear driven by said Geneva gear, a projecting pin carried by said driven gear, a lever supported to oscillate about said vertical shaft and having a slot arranged to engage said pin, said slot comprising a semicircle having a radius substantially equal to the crank arm of said pin whereby said pin is operable to oscillate said lever through one portion of each revolution of said pin and ineffective to oscillate said lever during another portion of each revolution of the pin, and a mileage indicator drivingly connected to said lever.

6. In a taximeter, a base member, a pair of uprights mounted on said base member, a first shaft journalled in said uprights, a second shaft journalled in said uprights, fare indicating drums rotatably supported on said first shaft, mileage responsive means for operating said fare indicating drums including a pawl mechanism supported from said second shaft and a cooperating ratchet wheel in driving engagement with one of said fare indicating drums, coordinating gears supported for movement into and out of operative engagement with said fare indicating drums, supporting means for said coordinating gears including a substantially U-shaped stamped sheet metal frame pivotally mounted on said second shaft with the coordinating gears rotatably supported between the upstanding arms of said U-shaped frame, a coordinating gear liner, a stamped sheet metal support for said gear liner pivotally mounted on the upstanding arms of said U-shaped frame, cam means on said second named shaft for moving said liner into and out of engagement with said coordinating gears in response to rotation of said second named shaft, and a manual operator for said second shaft.

7. In a taximeter, a base member, a pair of uprights mounted on said base member, a first shaft journalled in said uprights, a second shaft journalled in said uprights, fare indicating drums rotatably supported on said first shaft, mileage responsive means for operating said fare indicating drums, coordinating gears supported for movement into and out of operative engagement with said fare indicating drums, supporting means for said coordinating gears including a substantially U-shaped stamped sheet metal frame pivotally mounted on said second shaft with the coordinating gears disposed between the upstanding arms of said U-shaped frame, a coordinating gear liner, a support for said gear liner pivotally mounted on the upstanding arms of said U-shaped frame, cam means on said second shaft for moving said liner into and out of engagement with said coordinating gears in response to rotation of said second named shaft, and second cam means on said second named shaft for moving said frame so as to disengage said coordinating gears from said fare indicating drums.

8. In a taximeter, a base member, a pair of uprights mounted on said base member, a first shaft journalled in said uprights, a second shaft journalled in said uprights, fare indicating drums rotatably supported on said first shaft, mileage responsive means for operating said fare indicating drums, coordinating gears supported for movement into and out of operative engagement with said fare indicating drums, supporting means for said coordinating gears including a substantially U-shaped stamped sheet metal frame pivotally mounted on said second shaft with the coordinating gears disposed between the upstanding arms of said U-shaped frame, a coordinating gear liner, a stamped sheet metal support for said gear liner pivotally mounted on the upstanding arms of said U-shaped frame, cam means on said second named shaft for moving said liner into and out of engagement with said coordinating gears in response to rotation of said second named shaft, second cam means on said second named shaft for moving said frame so as to disengage said coordinating gears from said fare indicating drums, a manual operator for said second shaft for turning the meter on and off, said first and second named cam means being so constructed and arranged that upon movement of said operator into the meter off position, said first cam means moves said liner into engagement with said coordinating gears before said second cam means moves said coordinating gears out of engagement with said fare indicating drums.

9. In a taximeter, a base member, a pair of uprights mounted on said base member, a first shaft journalled in said uprights, a second shaft journalled in said uprights, fare indicating drums rotatably supported on said first shaft, a first ratchet wheel fixed to said first shaft, a second ratchet wheel fixed to said first shaft, clock means for operating said first ratchet wheel, mileage responsive means for operating said second ratchet wheel, said mileage responsive means including means for preventing rotation of said second ratchet wheel in one direction, power transmitting means between said first shaft and said fare indicating drums including a pawl mechanism supported from said second shaft and a cooperating ratchet in driving engagement with one of said fare indicating drums, coordinating gears supported for movement into and out of operative engagement with said fare indicating drums, a one piece stamped sheet metal supporting frame for said coodinating gears pivotally mounted on said second shaft, a coordinating gear liner, a stamped sheet metal support for said coordinating gear liner mounted on said frame, first cam means on said second named shaft for moving said liner into and out of engagement with said coordinating gears in response to rotation of said second named shaft, and second cam means mounted on said second named shaft for moving said frame and said coordinating gears away from said fare indicating drums.

10. In a meter for use in a taxi or the like, a base member, a plurality of upright portions formed integrally with said base member, a shaft journalled between two of said upright portions, fare indicating drums rotatably supported on said shaft, first means for transmitting power from said shaft to said fare indicating drums, a first ratchet wheel fixed to said shaft, a second ratchet wheel fixed to said shaft, clock means for operating said first ratchet wheel, second means supported on one of said uprights for transmitting power from said clock means to said first ratchet wheel, speed responsive means for operating said second ratchet wheel, said clock means comprising a self-contained clock removable as a unit from said base member and from said second power transmitting means and comprising a pair of side frames straddling one of said uprights so as to be positioned thereby, and means for removably securing said side frames to said last named upright.

RALPH A. MILLER.

REFERENCES CITED

The following references are of record in the file of this patent:

UNITED STATES PATENTS

| Number | Name | Date |
| --- | --- | --- |
| 1,058,222 | Decker | Apr. 8, 1913 |
| 1,160,137 | Browne | Nov. 16, 1915 |
| 1,522,910 | Richert | Jan. 13, 1925 |
| 1,546,826 | De Lavaud | July 21, 1925 |
| 1,744,307 | Gluck | Jan. 21, 1930 |
| 1,762,862 | Gluck | June 10, 1930 |
| 1,794,808 | Tingley | Mar. 3, 1931 |
| 1,874,962 | Gluck et al. | Aug. 30, 1932 |
| 1,894,384 | Vlahov | Jan. 17, 1933 |
| 2,061,636 | Saunders | Nov. 24, 1936 |
| 2,080,699 | Coil | May 18, 1937 |
| 2,315,569 | White | Apr. 6, 1943 |
| 2,428,080 | Horn | Sept. 30, 1947 |